US008799548B2

(12) United States Patent
Oohira (10) Patent No.: US 8,799,548 B2
(45) Date of Patent: Aug. 5, 2014

(54) I/O BRIDGE DEVICE, RESPONSE-REPORTING METHOD, AND PROGRAM

(75) Inventor: Toshio Oohira, Tokyo (JP)

(73) Assignee: NEC Corporation, Tokyo (JP)

( * ) Notice: Subject to any disclaimer, the term of this patent is extended or adjusted under 35 U.S.C. 154(b) by 357 days.

(21) Appl. No.: 13/232,669

(22) Filed: Sep. 14, 2011

(65) Prior Publication Data

US 2012/0072637 A1    Mar. 22, 2012

(30) Foreign Application Priority Data

Sep. 16, 2010   (JP) ................................ 2010-207542

(51) Int. Cl.
  *G06F 13/36*   (2006.01)
(52) U.S. Cl.
  USPC .......................................... 710/311; 710/313
(58) Field of Classification Search
  USPC .................................................. 710/311, 313
  See application file for complete search history.

(56) References Cited

U.S. PATENT DOCUMENTS

| 7,676,617 | B2 * | 3/2010 | Kloeppner ..................... 710/105 |
| 7,685,352 | B2 * | 3/2010 | Gregg et al. ................... 710/310 |
| 8,140,922 | B2 * | 3/2012 | Haraden et al. ............... 714/724 |
| 8,161,221 | B2 * | 4/2012 | Shimotaya et al. ........... 710/313 |
| 2005/0289278 | A1 * | 12/2005 | Tan et al. ....................... 710/310 |
| 2010/0306442 | A1 * | 12/2010 | Gregg ............................. 710/313 |
| 2011/0320675 | A1 * | 12/2011 | Gregg et al. ................... 710/315 |

FOREIGN PATENT DOCUMENTS

| JP | 5-233528 A | 9/1993 |
| JP | 8-314854 A | 11/1996 |
| JP | 9-44443 A | 2/1997 |
| JP | 9-81502 A | 3/1997 |
| JP | 2003-18240 A | 1/2003 |
| JP | 2005-182536 A | 7/2005 |
| JP | 2005-208972 A | 8/2005 |
| JP | 2009-199428 A | 9/2009 |

OTHER PUBLICATIONS

Office Action, dated Apr. 2, 2013, issued by the Japanese Patent Office in counterpart Japanese Patent Application No. 2010-207542.
Communication dated Aug. 7, 2012 issued by the Japanese Patent Office in counterpart Japanese Patent Application No. 2010-207542.

* cited by examiner

*Primary Examiner* — Brian Misiura
(74) *Attorney, Agent, or Firm* — Sughrue Mion, PLLC (57) ABSTRACT

An I/O bridge device includes: a command receiver that receives a command signal indicating a command to a memory controller from a peripheral component; a converter that converts the command signal into a command packet including the command and identification information for identifying the command signal; a command transmitter that transmits the command packet to the memory controller; a response receiver that receives, from the memory controller, a response packet to the command packet, the response packet including the identification information; and a write command transmitter that transmits a write command signal to the peripheral component that is a transmission source of the command signal, the write command signal indicating a command for the writing a content of the response packet to an internal memory of the peripheral component.

5 Claims, 9 Drawing Sheets

| SPECIAL FLAG | SPECIAL COMMAND | REPLYING METHOD |
|---|---|---|
| 000 | ---- | NO REPLY PROCESS |
| 010 | 0000 | AFTER WAITING FOR A RESPONSE FROM MEMORY CONTROLLER, TRANSMIT MMWT TRANSACTION FOR REPLYING TO RELEVANT PCIe DEVICE |
| | 0001 | HAVING RECEIVING MMWT TRANSACTION FROM PCIe DEVICE, TRANSMIT MMWT TRANSACTION FOR REPLYING TO RELEVANT PCIe DEVICE |

I/O BRIDGE DEVICE, RESPONSE-REPORTING METHOD, AND PROGRAM

This application is based upon and claims the benefit of priority from Japanese patent application No. 2010-207542, filed on Sep. 16, 2010, the disclosure of which is incorporated herein in its entirety by reference.

BACKGROUND OF THE INVENTION

1. Field of the Invention

The present invention relates to an I/O bridge device that transmits commands between a memory controller, which executes processes with respect to a main storage device, and peripheral components, a response-reporting method, and a program.

2. Description of Related Art

Recently, peripheral component interconnect express (PCI Express, hereinafter PCIe) is increasingly being used as a high-speed serial interface technology. PCIe is a standard with features such as serial signal transmission at 2.5 Gbps, a non-branching signal connection path with no point-to-point bus structure, data communication using protocols, and PCI compatibility with software. PCIe has replaced PCI as the interface standard.

In addition to ordinary communication functions, PCIe includes expanded PCI functions for processing errors. In PCI, errors were classified into two types: parity errors and system errors. In contrast, in PCIe, errors are classified into three types: 'recoverable errors', 'fatal unrecoverable errors', and 'non-fatal unrecoverable errors'. These error types are reported in a standardized error message to a route complex (I/O bridge device). The route complex is a device that includes one or a plurality of PCIe ports, and relays communications between PCIe-standard peripheral components and a CPU and a memory (main storage device).

When using the basic PCIe error-processing function, the only information that can be obtained is the error type. However, by using PCIe advanced error reporting, when an error occurs, detailed information such as the cause of the error can be stored, and a detailed error analysis can be carried out.

Thus the error-processing in PCIe is more advanced than in PCI.

PCIe defines three types of transactions to be handled: posted transactions, non-posted transactions, and completion transactions. A posted transaction is a transaction that does not require a response, such as a memory write transaction. A non-posted transaction is a transaction that requires a response, such as a memory read transaction. A completion transaction is a transaction in response to a non-posted transaction.

In the present application, the term 'transaction' denotes a protocol data unit (PDU) for transmitting data used in communications between PCIe standard peripheral components and the route complex.

Japanese Unexamined Patent Application, First Publication No. 2005-208972 (hereinafter abbreviated as Patent Document 1) discloses a method of continuing operations even when the route complex has stopped due to a failure.

According to Patent Document 1, when a peripheral component or a CPU transmits a non-posted transaction to the route complex, and the I/O bridge device stops before the completion transaction that is the response arrives at the peripheral component or the CPU, an error reply generate circuit provided at the route complex transmits a non-posted transaction indicating an error reply, instead of the route complex.

By means of the PCIe error-processing function described above, the route complex can ascertain that an error has occurred, and obtain detailed information, such as the cause of the failure, at that time. However, when the transaction transmitted by the CPU/peripheral component is a posted transaction, the device that is the transmission source of the transaction is unable to receive an error report.

That is, if the peripheral component issues a posted transaction, such as a memory write transaction, and an error occurs while processing that transaction, the peripheral component is unable to ascertain that the error occurred, and the operation continues.

Even if the route complex, after receiving an error report, obtains and analyzes the failure information, and reports the occurrence of the failure to the peripheral component that is the object, there will be a time lag from the time when the error occurred. Consequently, the peripheral component cannot execute a failure process for the transaction in which the error has occurred.

While such error-processing problems exist in PCIe, ordinarily, processes such as writing data from a PCIe device to a memory are performed using posted transactions in order to prioritize performance. Hence, the peripheral component does not receive a response indicating the process result, and the source that issued the transaction cannot ascertain the process status of that transaction.

Therefore, when an error occurs while processing a memory write transaction issued by a PCIe device, it is processed as a 'fatal unrecoverable error' with a danger of fatal failure such as a shutdown of the system.

In a comparatively small-scale computer system such as a personal computer, this sort of error process might not be problematic. However, in a large-scale computer system which, as far as is possible, is expected to continue operating (e.g. a system that is normally run on a main frame or a large-scale server), a system shutdown is catastrophic and must be avoided.

While the method disclosed in Patent Document 1 can obtain a response to non-posted transaction, it cannot obtain a response to a posted transaction.

SUMMARY OF THE INVENTION

The present invention has been conceived in view of the above problems. An I/O bridge device according to a first exemplary aspect of the present invention transfers commands between a memory controller for performing processes to a main storage device and a peripheral component. The I/O bridge device includes: a command receiver that receives a command signal indicating a command to the memory controller from the peripheral component; a converter that converts the command signal received by the command receiver into a command packet including the command indicated by the command signal and identification information for identifying the command signal received by the command receiver; a command transmitter that transmits the command packet converted by the converter to the memory controller; a response receiver that receives, from the memory controller, a response packet to the command packet transmitted by the command transmitter, the response packet including the identification information included in the command packet transmitted by the command transmitter; and a write command transmitter that transmits a write command signal to the peripheral component that is a transmission source of the command signal indicated by the identification information included in the response packet received by the response receiver, the write command signal indicating a command for writing a content of the response packet received by the response receiver to an internal memory of the peripheral component.

A response-reporting method according to a second exemplary aspect of the present invention is used for an I/O bridge device that transfers commands between a memory controller for performing processes to a main storage device and a peripheral component. The response-reporting method includes: receiving a command signal indicating a command to the memory controller from the peripheral component; converting the command signal into a command packet including the command indicated by the command signal and identification information for identifying the command signal; transmitting the command packet to the memory controller; receiving, from the memory controller, a response packet to the command packet, the response packet including the identification information included in the command packet; and transmitting a write command signal to the peripheral component that is a transmission source of the command signal indicated by the identification information included in the response packet, the write command signal indicating a command for writing a content of the response packet to an internal memory of the peripheral component.

A recording medium according to a third exemplary aspect of the present invention stores a computer program. The computer program makes an I/O bridge device, which transfers commands between a memory controller for performing processes to a main storage device and a peripheral component, function as: a command receiver that receives a command signal indicating a command to the memory controller from the peripheral component; a converter that converts the command signal received by the command receiver into a command packet including the command indicated by the command signal and identification information for identifying the command signal received by the command receiver; a command transmitter that transmits the command packet converted by the converter to the memory controller; a response receiver that receives, from the memory controller, a response packet to the command packet transmitted by the command transmitter, the response packet including the identification information included in the command packet transmitted by the command transmitter; and a write command transmitter that transmits a write command signal to the peripheral component that is a transmission source of the command signal indicated by the identification information included in the response packet received by the response receiver, the write command signal indicating a command for writing a content of the response packet received by the response receiver to an internal memory of the peripheral component.

According to the invention, when the I/O bridge device receives a response packet from the memory controller, it writes the content of that response packet in a built-in memory of the peripheral component that is the transmission source of the command signal. Therefore, the peripheral component can obtain the content of the error by referring to information written in the built-in memory.

DETAILED DESCRIPTION OF THE INVENTION

Preferred exemplary embodiments of the invention will be explained with reference to the drawings.

First Exemplary Embodiment

Figure 1:
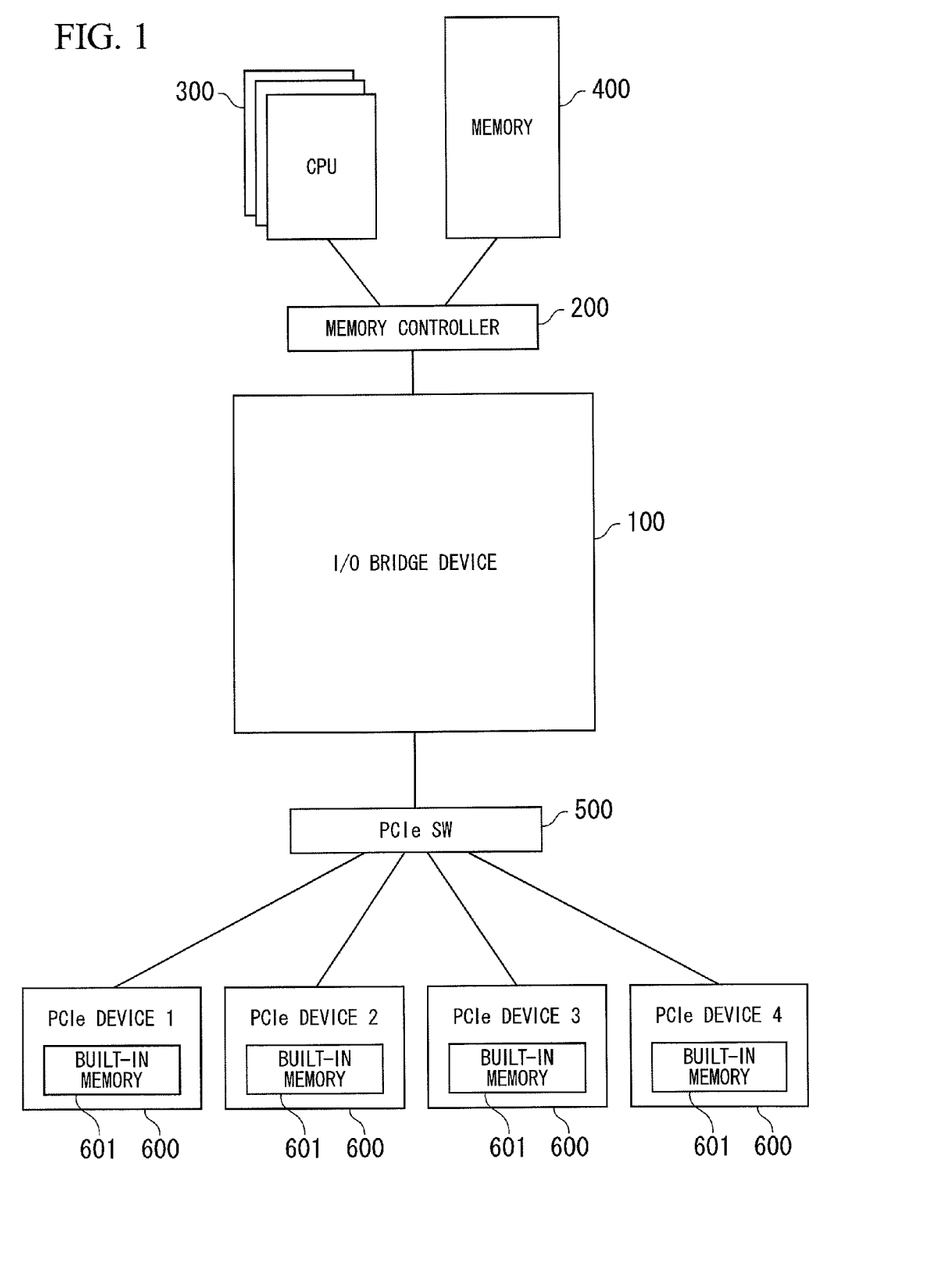
FIG. 1 is a schematic block diagram of the configuration of a computer system including an I/O bridge device according to a first exemplary embodiment of the invention.

FIG. 1 is a schematic block diagram of the configuration of a computer system including an I/O bridge device according to a first exemplary embodiment of the invention.

As shown in FIG. 1, a computer system includes a CPU 300, a memory 400 (main storage device), a memory controller 200, an I/O bridge device 100, a PCIe switching device 500, and a plurality of PCIe devices 600 (peripheral components).

The memory controller 200 is connected to the CPU 300, the memory 400, and the I/O bridge device 100. The memory controller 200 relays communications between the CPU 300 and the memory 400 and the I/O bridge device 100.

The I/O bridge device 100 is connected to the memory controller 200 and the PCIe switching device 500. The I/O bridge device 100 is a route complex that relays communications between the memory controller 200 and the PCIe switching device 500.

The PCIe switching device 500 is connected to the plurality of PCIe devices 600 and the I/O bridge device 100. The PCIe switching device 500 relays communications between the PCIe devices 600 and the I/O bridge device 100.

The PCIe devices 600 transmit transactions relating to the CPU 300 and the memory 400 via the PCIe switching device 500 to the I/O bridge device 100. Each of the PCIe devices 600 includes a built-in memory 601 for storing error information.

Figure 2:
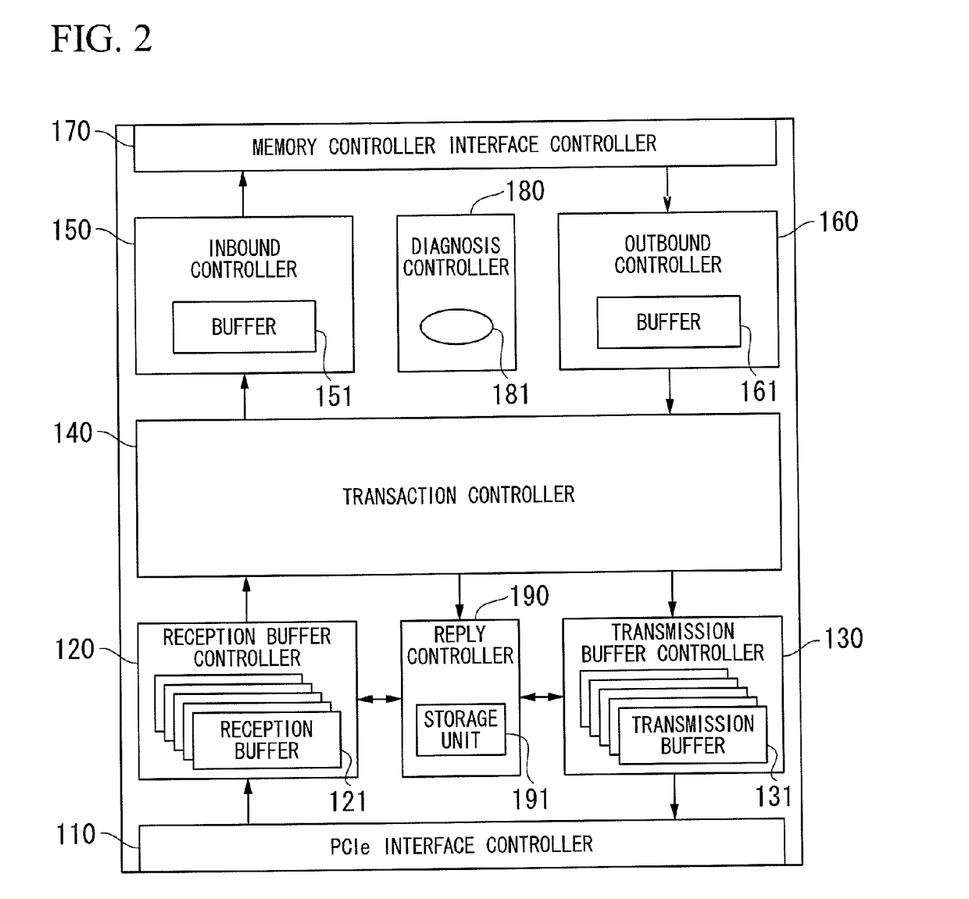
FIG. 2 is a schematic block diagram of the configuration of the I/O bridge device according to the first exemplary embodiment of the invention.

FIG. 2 is a schematic block diagram of the configuration of an I/O bridge device 100 according to the first exemplary embodiment of the invention.

The I/O bridge device 100 includes a PCIe interface controller 110 (command receiver, write command transmitter), a reception buffer controller 120, a transmission buffer controller 130, a transaction controller 140 (converter), an inbound controller 150, an outbound controller 160, a memory controller interface controller 170 (command transmitter, response receiver), a diagnosis controller 180 (internal error-detecting unit, failure-reporting unit), and a reply controller 190 (recorder, transmission source information-reading unit).

The PCIe interface controller 110 performs transmission/reception processes of transactions (command signals) with the PCIe switching device 500 connected thereto. The PCIe interface controller 110 outputs transactions received from the PCIe switching device 500 to the reception buffer controller 120. The PCIe interface controller 110 transmits transactions inputted from the transmission buffer controller 130 to the PCIe switching device 500.

The reception buffer controller 120 includes a plurality of reception buffers 121 for storing transactions inputted from the PCIe interface controller 110. The reception buffer controller 120 stores a transaction received from the PCIe interface controller 110 in an empty reception buffer 121. The reception buffer controller 120 outputs the header of a transaction received from the PCIe interface controller 110, and a buffer number which is an identification information of the reception buffer 121 storing that transaction, to the reply controller 190. That is, the transaction can be identified by referring to the buffer number.

The transmission buffer controller 130 includes a plurality of transmission buffers 131 for storing transactions received from the transaction controller 140. The transmission buffer controller 130 stores a transaction received from the transaction controller 140 in a transmission buffer 131 which has the buffer number specified by the reply controller 190. The transmission buffer controller 130 transmits the transactions stored in the transmission buffers 131 to the PCIe interface controller 110.

The transaction controller 140 extracts a transaction stored in the reception buffer 121 of the reception buffer controller 120, and converts it to a command packet containing a unique ID and a processing content (command) indicating that transaction. Here, 'extract' denotes a process of reads information from the buffer, and then deleting that information from the buffer. The transaction controller 140 stores the buffer number of the reception buffer 121 that was storing the extracted transaction in association with the ID of the converted command packet in an internal memory.

The transaction controller 140 outputs the converted command packet to the inbound controller 150, and receives a response packet for that command packet from the outbound controller 160. The transaction controller 140 reads the buffer number associated with the ID of the response packet received from the outbound controller 160 from the internal memory, and outputs that buffer number together with the response packet to the reply controller 190.

The inbound controller 150 includes a buffer 151 for storing packets to be transmitted to the memory controller 200. The inbound controller 150 stores a command packet received from the transaction controller 140 in the buffer 151. The inbound controller 150 outputs the command packet stored in the buffer 151 to the memory controller interface controller 170.

The outbound controller 160 includes a buffer 161 for storing packets received from the memory controller 200. The outbound controller 160 stores response packets received from the memory controller interface controller 170 in the buffer 161. The outbound controller 160 has a function of outputting response packets stored in the buffer 161 to the transaction controller 140.

The memory controller interface controller 170 transmits a command packet received from the inbound controller 150 to the memory controller 200. The memory controller interface controller 170 receives the response packet from the memory controller 200, and outputs it to the outbound controller 160.

When another processing unit has reported to the diagnosis controller 180 that a failure has occurred, the diagnosis controller 180 lights a failure indicator 181, and reports to the outside that a failure has occurred in the self device. When another processing unit has reported to the diagnosis controller 180 that a failure has occurred, the diagnosis controller 180 also reports the failure to the PCIe interface controller 110, the reception buffer controller 120, the transmission buffer controller 130, the transaction controller 140, the inbound controller 150, the outbound controller 160, the memory controller interface controller 170, and the reply controller 190.

The reply controller 190 includes a storage unit 191 that stores the headers of transactions in association with the buffer numbers of the reception buffers 121 storing those transactions. The reply controller 190 stores the header of a transaction inputted from the reception buffer controller 120 and the buffer number in the storage unit 191. The reply controller 190 receives the buffer number associated with the ID included in the response packet from the transaction controller 140, and reads the transaction associated with that buffer number. The reply controller 190 also receives the response packet from the transaction controller 140, creates a transaction that will be a response to the PCIe device 600 based on that response packet, and outputs that transaction together with the buffer number to the transmission buffer controller 130. A 'transaction that will be a response' is a memory write transaction (write command signal) for writing the content of the response packet to the internal memory 601 of the PCIe device 600.

When the PCIe interface controller 110, the reception buffer controller 120, the transmission buffer controller 130, the transaction controller 140, the inbound controller 150, the outbound controller 160, the memory controller interface controller 170, and the reply controller 190 detect some sort of failure during processing (parity error, ECC error, control contradiction, etc.), they report the failure to the diagnosis controller 180.

With this configuration, the I/O bridge device 100 performs the following process. The PCIe interface controller 110 receives a transaction indicating a command to the memory controller 200 from the PCIe device 600. The transaction controller 140 then converts the transaction received by the PCIe interface controller 110 to a command packet containing an ID and a command indicating that transaction. As described above, the ID is associated with the buffer number, and makes it possible to identify the transaction received by the PCIe interface controller 110.

The memory controller interface controller 170 transmits the command packet converted by the transaction controller 140 to the memory controller 200, and receives a response packet to the command packet, containing the ID in that command packet, from the memory controller 200. The PCIe interface controller 110 then transmits a memory write transaction indicating a command to write the content of the response packet received by the memory controller interface controller 170 to the built-in memory 601 to the PCIe device 600 that is the transmission source of the transaction identified by the ID included in the response packet received by the memory controller interface controller 170.

The PCIe device 600 can thus obtain the content of the error by referring to the information written in the built-in memory 601.

Subsequently, an operation of the I/O bridge device 100 according to this exemplary embodiment will be explained. In the example described here, a PCIe device 600 transmits a memory write transaction.

Firstly, an operation when a memory write process is performed normally will be explained.

Figure 3:
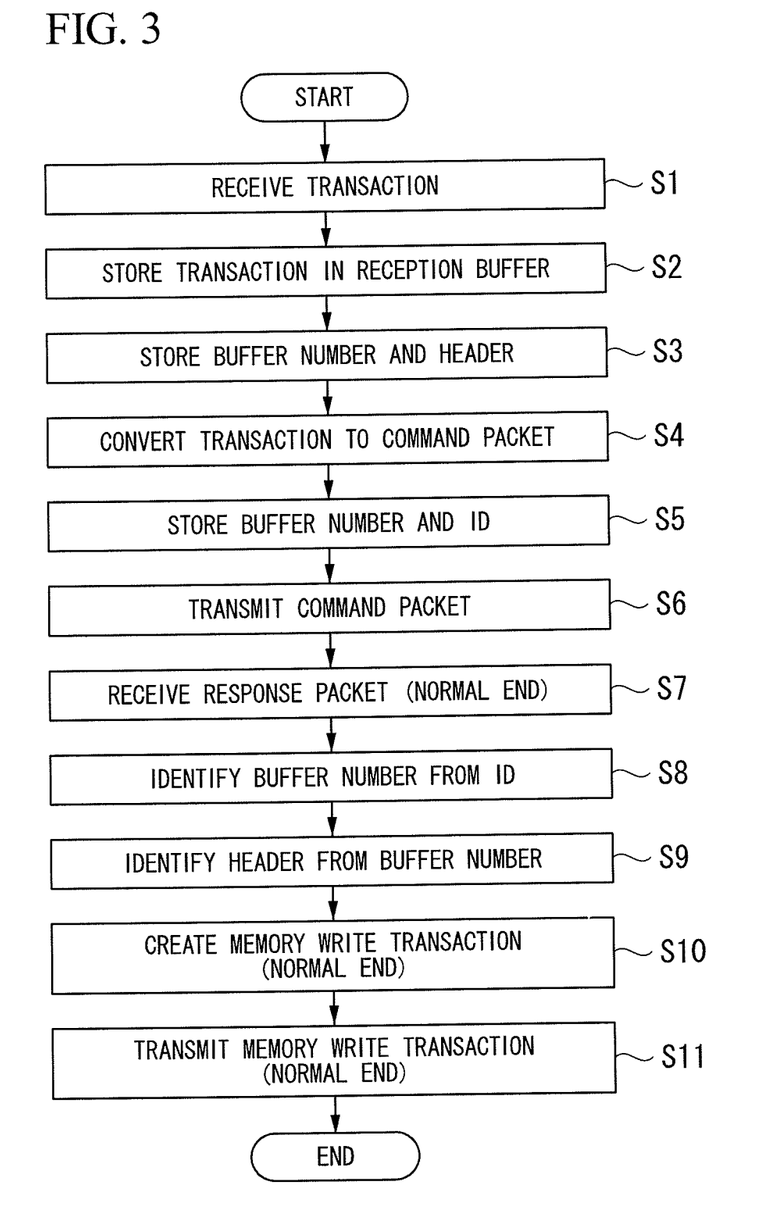
FIG. 3 is a flowchart of an operation when a memory write process is performed normally, in the first exemplary embodiment.

FIG. 3 is a flowchart of an operation when a memory write process is performed normally.

The memory write transaction transmitted by the PCIe device 600 passes via the PCIe switching device 500, and is received by the PCIe interface controller 110 of the I/O bridge device 100 (Step S1). The received memory write transaction is passed to the reception buffer controller 120, and stored in an empty reception buffer 121 (Step S2).

The reception buffer controller 120 reads the memory write transaction stored in the reception buffer 121, and outputs the buffer number identifying the buffer that was storing it and the header of the memory write transaction to the reply controller 190. The reply controller 190 stores the buffer number and the header inputted from the reception buffer controller 120 in association with each other in the storage unit 191 (Step S3), and waits for an inquiry regarding that buffer number.

The reception buffer controller 120 also outputs the memory write transaction that was read from the reception buffer 121, together with the buffer number of the reception buffer 121 that was storing it, to the transaction controller 140. The transaction controller 140 converts the memory write transaction inputted from the reception buffer controller 120 to a memory write packet (command packet) (Step S4), and stores it in the buffer 151 of the inbound controller 150.

In converting the memory write transaction to a memory write packet, the transaction controller 140 sets a unique ID for the memory write packet, and stores it in that memory write packet. The transaction controller 140 stores the set ID in association with the buffer number in the internal memory thereof (Step S5). Since this ID is also reflected in the response packet that the memory controller 200 transmits, the transaction controller 140 can use the ID to manage the packet, and thereby detect if the response is timed out or if the packet is lost.

The inbound controller 150 transmits the memory write packet stored in the buffer 151 via the memory controller interface controller 170 to the memory controller 200 (Step S6).

The memory controller 200 stores the data contained in the received memory write packet at the corresponding memory address, and transmits the response packet (normal end) to the I/O bridge device 100.

When the memory controller 200 transmits the response packet, the memory controller interface controller 170 of the I/O bridge device 100 receives the response packet from the memory controller 200 (Step S7), and stores it in the buffer 161 of the outbound controller 160.

The outbound controller 160 reads the stored response packet and outputs it to the transaction controller 140. The transaction controller 140 reads the ID in the response packet, and reads the buffer number associated with that ID from the internal memory (Step S8). The transaction controller 140 then outputs the content of the response packet (normal end) together with the buffer number to the reply controller 190.

The reply controller 190 reads the header associated with the buffer number inputted by the transaction controller 140 from the storage unit 191 (Step S9). The reply controller 190 then identifies the PCIe device 600 that is the transmission source of the transaction based on that header, and creates a memory write transaction destined for that PCIe device 600 (Step S10). At this time, the reply controller 190 reflects the content of the response packet inputted from the transaction controller 140 (normal end) in the memory write transaction. The reply controller 190 then stores the created memory write transaction in the transmission buffer 131 of the transmission buffer controller 130.

The transmission buffer controller 130 reads the memory write transaction stored in the transmission buffer 131, and transmits it via the PCIe interface controller 110 to the PCIe switching device 500 (Step S11).

The PCIe switching device 500 transfers the received memory write transaction to the relevant PCIe device 600. The PCIe device 600 that receives the memory write transaction stores write data contained in the transaction (i.e. the content of the response packet) in the built-in memory 601.

Thus the PCIe device 600 can ascertain that the transaction has ended normally by referring to the information written in the built-in memory 601.

Figure 4:
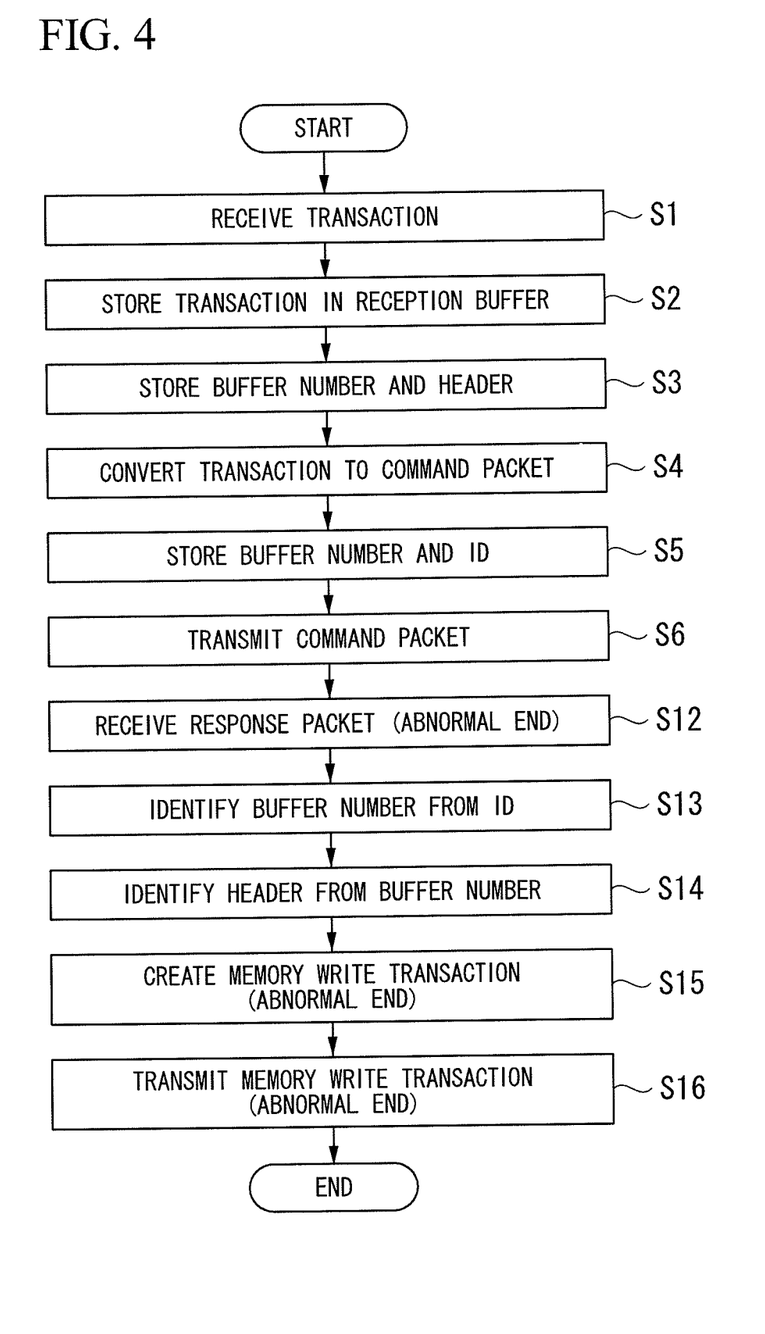
FIG. 4 is a flowchart of an operation when a response packet from a memory controller indicates an error, in the first exemplary embodiment.

Subsequently, an operation when a response packet from the memory controller 200 indicates an error will be explained. Processes which are identical to those when a memory write process is performed normally as described above are designated with like reference symbols.

FIG. 4 is a flowchart of an operation when a response packet from the memory controller 200 indicates an error.

The memory write transaction transmitted by the PCIe device 600 passes via the PCIe switching device 500, and is received by the PCIe interface controller 110 of the I/O bridge device 100 (Step S1). The received memory write transaction is passed to the reception buffer controller 120, and stored in an empty reception buffer 121 (Step S2).

The reception buffer controller 120 reads the memory write transaction stored in the reception buffer 121, and outputs the buffer number identifying the buffer that was storing it and the header of the memory write transaction to the reply controller 190. The reply controller 190 stores the buffer number and the header inputted from the reception buffer controller 120 in association with each other in the storage unit 191 (Step S3), and waits for an inquiry regarding that buffer number.

The reception buffer controller 120 also outputs the memory write transaction that was read from the reception buffer 121, together with the buffer number of the reception buffer 121 that was storing it, to the transaction controller 140. The transaction controller 140 converts the memory write transaction inputted from the reception buffer controller 120 to a memory write packet (Step S4), and stores it in the buffer 151 of the inbound controller 150.

In converting the memory write transaction to a memory write packet, the transaction controller 140 sets a unique ID for the memory write packet, and stores it in that memory write packet. The transaction controller 140 stores the set ID in association with the buffer number in the internal memory (Step S5).

The inbound controller 150 transmits the memory write packet stored in the buffer 151 via the memory controller interface controller 170 to the memory controller 200 (Step S6).

If memory controller 200 detects some sort of error when storing the data contained in the received memory write packet at the corresponding memory address, it transmits the response packet (abnormal end) to the I/O bridge device 100.

When the memory controller 200 transmits the response packet, the memory controller interface controller 170 of the I/O bridge device 100 receives the response packet from the memory controller 200 (Step S12), and stores it in the buffer 161 of the outbound controller 160.

The outbound controller 160 reads the stored response packet, and outputs it to the transaction controller 140. The transaction controller 140 reads the ID contained in the response packet, and reads the buffer number associated with that ID from the internal memory (Step S13). The transaction controller 140 then outputs the content of the response packet (abnormal end) together with the buffer number to the reply controller 190.

The reply controller 190 reads the header associated with the buffer number inputted by the transaction controller 140 from the storage unit 191 (Step S14). The reply controller 190 then identifies the PCIe device 600 that is the transmission source of the transaction based on that header, and creates a memory write transaction destined for that PCIe device 600 (Step S15). At this time, the reply controller 190 reflects the content of the response packet (abnormal end) inputted from the transaction controller 140 in the memory write transaction. The reply controller 190 then stores the created memory write transaction in the transmission buffer 131 of the transmission buffer controller 130.

The transmission buffer controller 130 reads the memory write transaction stored in the transmission buffer 131, and transmits it via the PCIe interface controller 110 to the PCIe switching device 500 (Step S16).

The PCIe switching device 500 transfers the received memory write transaction to the relevant PCIe device 600. The PCIe device 600 that receives the memory write transaction stores the write data contained in the transaction in the built-in memory 601.

Thus the PCIe device 600 can confirm that an abnormality occurred during the memory write process by referring to the information written in the built-in memory 601, and can execute a failure process.

Figure 5:
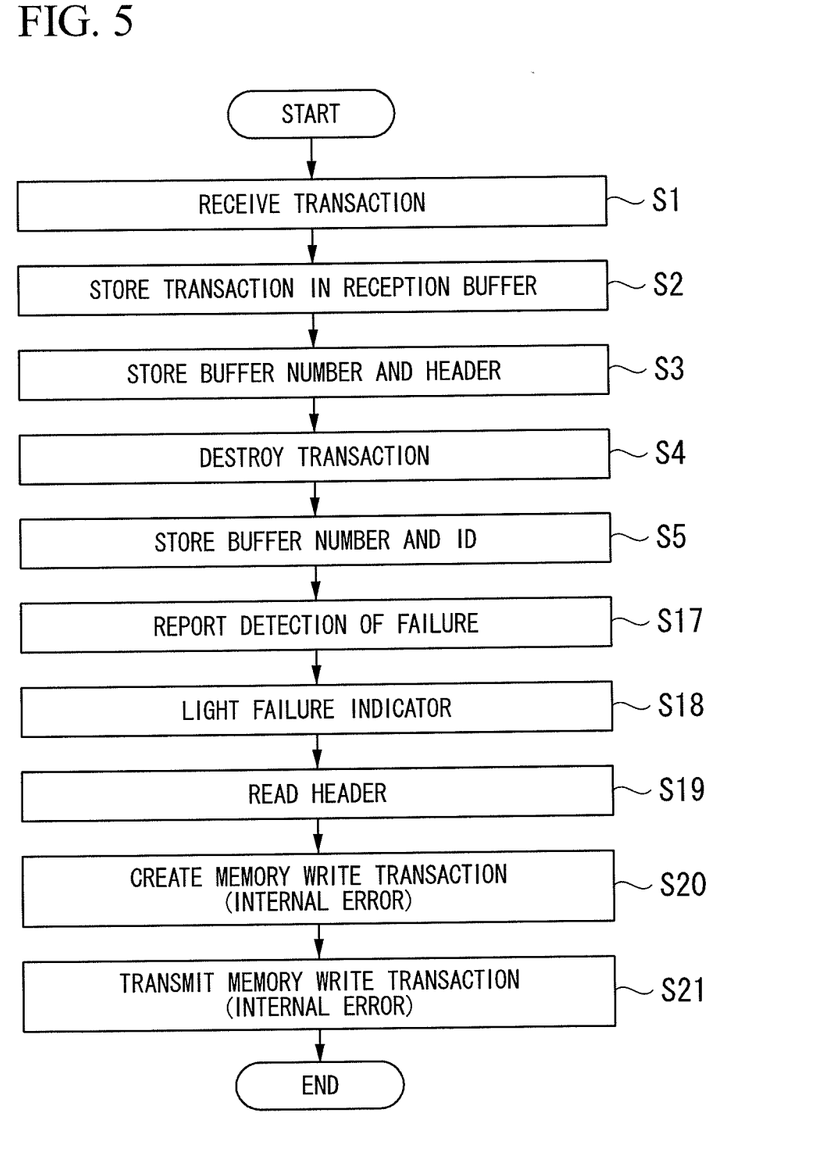
FIG. 5 is a flowchart of an operation when a failure has occurred inside the I/O bridge device, in the first exemplary embodiment.

Subsequently, an operation when a failure has occurred in the I/O bridge device 100 will be explained. Processes which are identical to those when a memory write process is performed normally as described above are designated with like reference symbols.

FIG. 5 is a flowchart of an operation when a failure has occurred in the I/O bridge device 100.

A memory write transaction transmitted by the PCIe device 600 passes via the PCIe switching device 500, and is received by the PCIe interface controller 110 of the I/O bridge device 100 (Step S1). The received memory write transaction is passed to the reception buffer controller 120, and stored in an empty reception buffer 121 (Step S2).

The reception buffer controller 120 reads the memory write transaction stored in the reception buffer 121, and outputs the buffer number identifying the buffer that was storing it and the header of the memory write transaction to the reply controller 190. The reply controller 190 stores the buffer number and the header inputted from the reception buffer controller 120 in association with each other in the storage unit 191 (Step S3), and waits for an inquiry regarding that buffer number.

The reception buffer controller 120 also outputs the memory write transaction read from the reception buffer 121, together with the buffer number of the reception buffer 121 that was storing it, to the transaction controller 140. The transaction controller 140 converts the memory write transaction inputted from the reception buffer controller 120 to a memory write packet (Step S4), and stores it in the buffer 151 of the inbound controller 150.

In converting the memory write transaction to a memory write packet, the transaction controller 140 sets a unique ID for the memory write packet, and stores it in that memory write packet. The transaction controller 140 stores the set ID in association with the buffer number in the internal memory (Step S5).

Here, when the inbound controller 150 (command abnormality-determining unit) detects an abnormality in the memory write packet stored in the buffer 151, it reports that a failure has been detected to the diagnosis controller 180 (Step S17). When the diagnosis controller 180 receives the report indicating that a failure has been detected from the inbound controller 150, it lights the failure indicator 181, and reports that a failure has occurred in the I/O bridge device 100 (Step S18). The diagnosis controller 180 also reports the failure in the I/O bridge device 100 to other processing units.

When the reply controller 190 receives the report indicating that a failure has occurred from the diagnosis controller 180, it reads the header stored in the storage unit 191 (Step S19). The reply controller 190 then identifies the PCIe device 600 that is the transmission source of the transaction based on that header, and creates a memory write transaction destined for that PCIe device 600 (Step S20). At this time, the reply controller 190 reflects information indicating that a failure has occurred in the I/O bridge device 100 in the memory write transaction. The reply controller 190 then stores the created memory write transaction in the transmission buffer 131 of the transmission buffer controller 130.

The transmission buffer controller 130 reads the memory write transaction stored in the transmission buffer 131, and transmits it via the PCIe interface controller 110 to the PCIe switching device 500 (Step S21).

The PCIe switching device 500 transfers the received memory write transaction to the relevant PCIe device 600. The PCIe device 600 that receives the memory write transaction stores the write data contained therein in the built-in memory 601.

Thus the PCIe device 600 can confirm that a failure occurred in the I/O bridge device 100 by referring to the information written in the built-in memory 601, and can execute a failure process.

Figure 6:
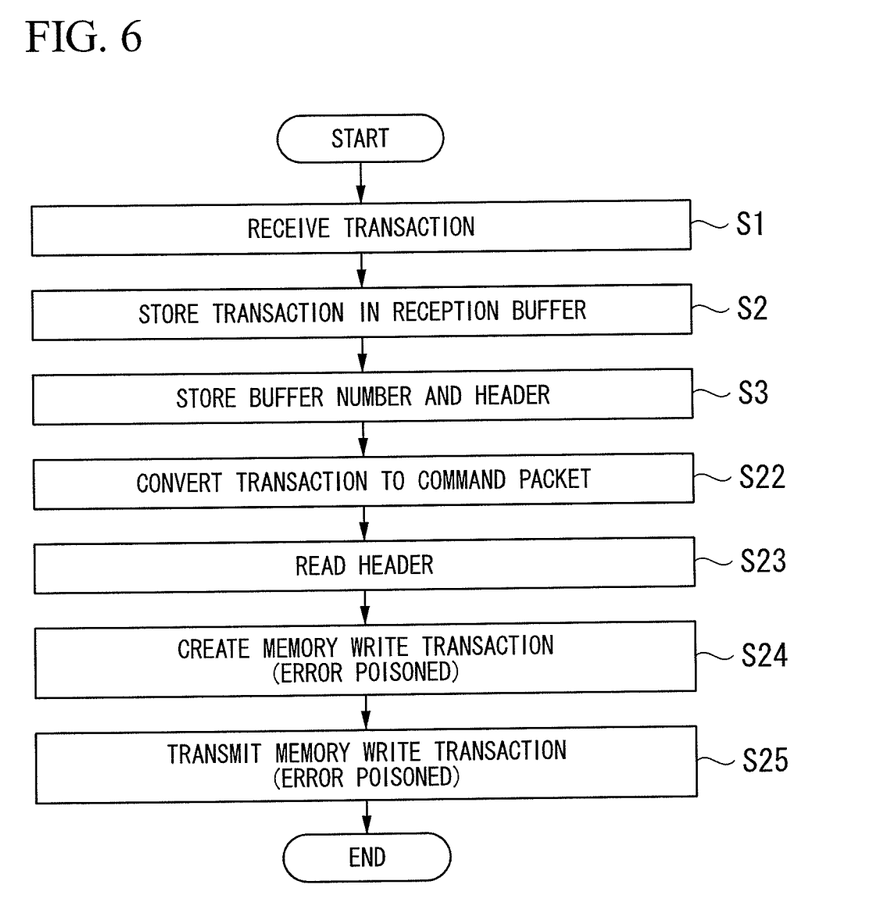
FIG. 6 is a flowchart of an operation when an error is detected before a memory write transaction arrives at the I/O bridge device, in the first exemplary embodiment.

Subsequently, an operation when an error is detected before a memory write transaction arrives at the I/O bridge device 100 will be explained. Processes which are identical to those when a memory write process is performed normally as described above are designated with like reference symbols.

FIG. 6 is a flowchart of an operation when an error is detected before a memory write transaction arrives at the I/O bridge device 100.

The memory write transaction transmitted by a PCIe device 600 is transmitted to the I/O bridge device 100 via the PCIe switching device 500. Before transferring the memory write transaction to the I/O bridge device 100, the PCIe switching device 500 determines whether it contains an error. If the PCIe switching device 500 determines that the memory write transaction contains an error, it sets a value indicating that an error has been detected (EP=1) in an EP field indicating an error poisoned state in the memory write transaction.

The PCIe interface controller 110 of the I/O bridge device 100 receives the memory write transaction transferred from the PCIe switching device 500 (Step S1). The received memory write transaction is passed to the reception buffer controller 120, and stored in an empty reception buffer 121 (Step S2).

The reception buffer controller 120 reads the memory write transaction stored in the reception buffer 121, and outputs the buffer number identifying the buffer that was storing it and the header of the memory write transaction to the reply controller 190. The reply controller 190 stores the buffer number and the header inputted from the reception buffer controller 120 in association with each other in the storage unit 191 (Step S3).

When the reception buffer controller 120 determines that the memory write transaction that was read is in an error poisoned state, it destroys the memory write transaction without passing it to the transaction controller 140 (Step S22).

The reply controller 190 then reads the header information from the storage unit 191 (Step S23), identifies the PCIe device 600 that is the transmission source of the transaction based on that header, and creates a memory write transaction destined for that PCIe device 600 (Step S24). At this time, the reply controller 190 reflects information indicating an error poisoned state in the memory write transaction. The reply controller 190 then stores the created memory write transaction in the transmission buffer 131 of the transmission buffer controller 130.

The transmission buffer controller 130 reads the memory write transaction stored in the transmission buffer 131, and transmits it via the PCIe interface controller 110 to the PCIe switching device 500 (Step S25).

The PCIe switching device 500 transfers the received memory write transaction to the relevant PCIe device 600. The PCIe device 600 that receives the memory write transaction stores the write data contained therein in the built-in memory 601.

Thus the PCIe device 600 can confirm that the memory write transaction is in an error poisoned state by referring to the information written in the built-in memory 601, and can execute a failure process.

In this manner, according to this exemplary embodiment, when the I/O bridge device 100 receives a response packet from the memory controller 200, it creates a memory write transaction for writing the content of that response packet to the built-in memory 601 of the PCIe device 600 that is the transmission source of the transaction. This enables the PCIe device 600 to obtain the content of the error by referring to the information written in the built-in memory 601.

Moreover, according to this exemplary embodiment, since the report process is performed by the reply controller 190 of the I/O bridge device 100 configured with hardware, there is no need for the device driver of the PCIe device 600 to insert a CPU process to confirm the process state. Therefore, the data transfer performance of the memory write transaction can achieve approximately the same speed as that of an I/O bridge device that does not perform a report process.

Second Exemplary Embodiment

Subsequently, a second exemplary embodiment of the invention will be explained in detail. In the second exemplary embodiment, constituent elements similar to those in the first exemplary embodiment are designated by like reference symbols, and are not repetitiously explained.

Figure 7:
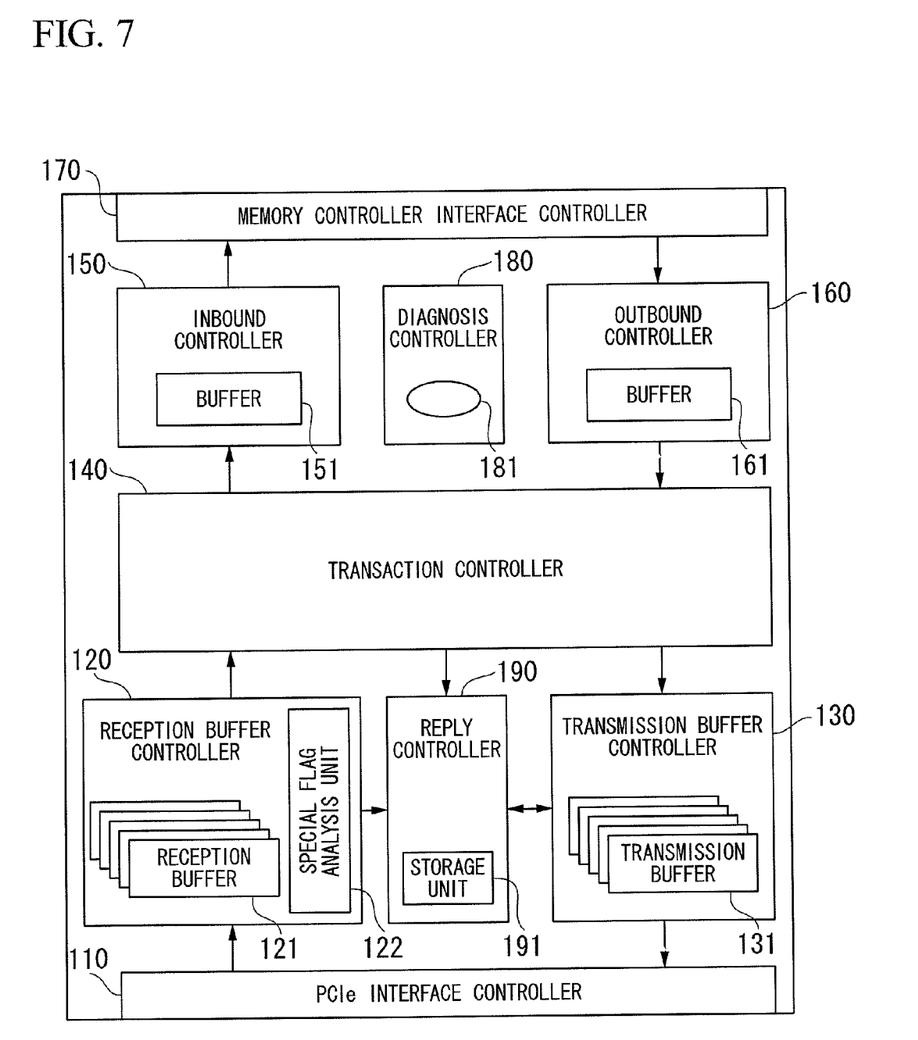
FIG. 7 is a schematic block diagram of the configuration of a computer system including an I/O bridge device according to a second exemplary embodiment of the invention.

FIG. 7 is a schematic block diagram of the configuration of an I/O bridge device 100 according to a second exemplary embodiment of the invention.

A reception buffer controller 120 of the I/O bridge device 100 according to the second exemplary embodiment includes a special flag analysis unit 122. The special flag analysis unit 122 reads information relating to a special flag and a special entry contained in a transaction, and determines a replying method in compliance with that information.

Figure 8:
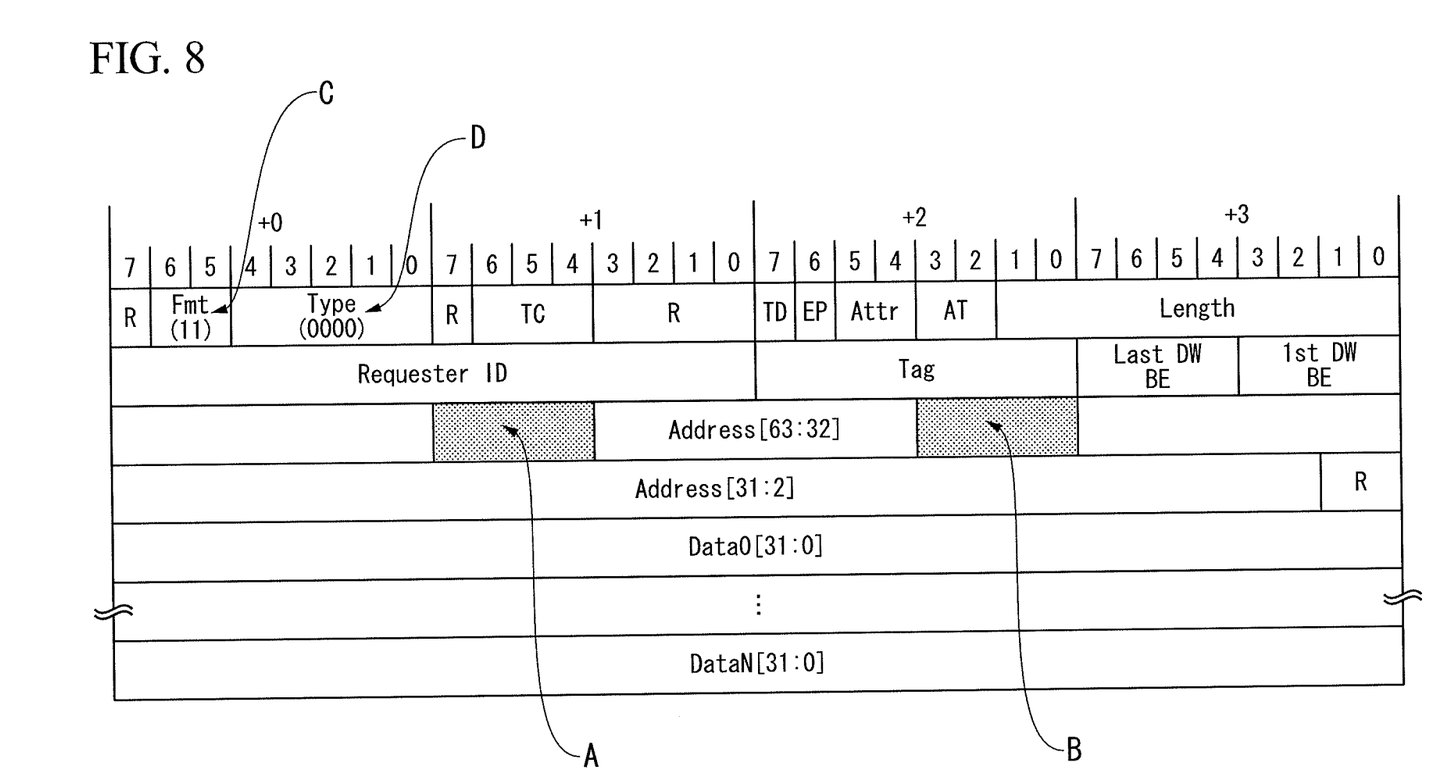
FIG. 8 is a diagram of the format of a memory write transaction, in the second exemplary embodiment.

FIG. 8 is diagram of a format of a memory write transaction.

The format of a memory write transaction according to this exemplary embodiment includes, in addition to the format compliant with PCIe specifications, an entry (3 bits) for setting a special flag at ADDRESS [54:52], and an entry (4 bits) for setting a special command at ADDRESS [43:40]. In FIG. 8, reference symbol A indicates a special flag. Reference symbol B indicates a special command. Reference symbol C indicates 4DW header, with data. Reference symbol D indicates memory indicates memory write request.

Figure 9:
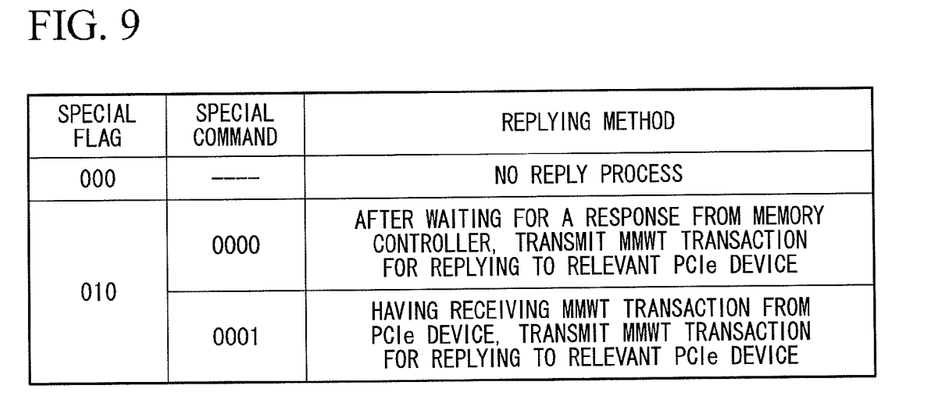
FIG. 9 is a table showing the relationship between a special flags and special entries and a reply method, in the second exemplary embodiment.

FIG. 9 is a table showing the relationship between the special flag and the special entry and the reply method.

Referring to FIG. 9, when the special flag indicates '000', the I/O bridge device 100 executes a posted process in similar manner to an ordinary memory write transaction. When the special flag indicates '010' and the special command indicates '0000', the I/O bridge device 100 executes a response with a memory write transaction process in similar manner to the first exemplary embodiment. When the special flag indicates '010' and the special command indicates '0001', the I/O bridge device 100 does not wait for completion of the memory write process, and executes a process of reporting only the response.

Specifically, when the special flag of the transaction that the reception buffer controller 120 has read from the reception buffer 121 indicates '000', the special flag analysis unit 122 controls the reception buffer controller 120 such that it does not output the header of the memory write transaction that was read to the reply controller 190. This ensures that, even if the reply controller 190 receives a response packet from the transaction controller 140, it does not create a transaction for reporting a response, and does not issue a response report. As a result, the I/O bridge device 100 can execute the same operation as in a posted process.

When the special flag indicates '010' and the special command indicates '0000', the special flag analysis unit 122 does not perform any particular process. Since a response is thus performed using the memory write transaction process described in the first exemplary embodiment, the memory write process state can be reported to the PCIe device 600.

When the special flag indicates '010' and the special command indicates '0001', the reception buffer controller 120 reports the header section of the transaction that the reception buffer controller 120 read from the reception buffer 121 to the reply controller 190, and, at the same time, instructs the reply controller 190 to execute a reply.

Having been instructed to execute a reply, the reply controller 190 creates a transaction for response based on the header of the received memory write transaction, and stores it in the transmission buffer 131 of the transmission buffer controller 130. This enables the I/O bridge device 100 to report the response to the relevant PCIe device 600 without waiting for a response packet indicating the completion of the memory write process.

Since the second exemplary embodiment provides the flags (special flag and special command) for use/non-use of the completion reporting function at an address space of the memory write transaction, a normal PCIe device 600 can be connected to the I/O bridge device 100 of the present embodiment. This has a new effect of ensuring the extensibility of the system construction. Moreover, by combining a special flag and a special command, other memory access methods (e.g. Test & Set, Synchronization) can be specified, whereby the functions of the device can easily be extended.

While the invention has been particularly shown and described with reference to exemplary embodiments thereof, the invention is not limited to these embodiments. It will be understood by those of ordinary skill in the art that various changes in form and details may be made therein without departing from the scope of the present invention as defined by the claims.

For example, while in the exemplary embodiments described above, the reply controller 190 stores the buffer number of the reception buffer 121 of the reception buffer controller 120, and the header of the transaction, in association with each other, the configuration is not limited to this one. For example, the reply controller 190 may receive the ID of the packet created by the transaction controller 140, and store this ID in association with the header.

Further, while in the exemplary embodiments described above, the processing units of the I/O bridge device 100 are each realized with hardware, the configuration is not limited to this one. For example, the configuration may be one where the I/O bridge device 100 internally includes a computer system, and the operations of the processing units described above are stored in a program format in a computer-readable recording medium, and the processes may then be realized by making the computer read the program. Here, 'computer-readable recording medium' denotes a magnetic disk, a magneto-optical disk, a CD-ROM, a DVD-ROM, a semiconductor memory, etc. The computer program may be distributed to the computer via a communication line, and executed by being read by the computer that received it.

The program may realize some of the functions described above. Moreover, the program may be one that realizes the functions in combination with a program already stored in the computer system, namely a differential file (differential program).

What is claimed is:

1. An I/O bridge device that transfers commands between a memory controller for performing processes to a main storage device and a peripheral component, the I/O bridge device comprising:
    a command receiver configured to receive a command signal indicating a command to the memory controller from the peripheral component;
    a converter configured to convert the command signal received by the command receiver into a command packet including the command indicated by the command signal and identification information for identifying the command signal received by the command receiver;
    a command transmitter configured to transmit the command packet converted by the converter to the memory controller;
    a response receiver configured to receive, from the memory controller, a response packet to the command packet transmitted by the command transmitter, the response packet including the identification information included in the command packet transmitted by the command transmitter;
    a write command transmitter configured to transmit a write command signal to the peripheral component that is a transmission source of the command signal indicated by the identification information included in the response packet received by the response receiver, the write command signal indicating a command for writing a content of the response packet received by the response receiver to an internal memory of the peripheral component;
    a recorder configured to store, in a storage unit, the identification information for identifying the command signal received by the command receiver, and transmission source information indicating the peripheral component that is the transmission source of the command signal received by the command receiver, in association with each other;
    a transmission source information-reading unit configured to read the transmission source information associated with the identification information included in the response packet received by the command receiver; and
    an internal error-detecting unit configured to detect an internal error in the I/O bridge device,
    wherein the write command transmitter transmits the write command signal to the peripheral component indicated by the transmission source information read by the transmission source information-reading unit; and
    when the internal error-detecting unit determines that there is an internal error in the I/O bridge device, the transmission source information-reading unit reads the transmission source information stored in the storage unit, and the write command transmitter transmits a memory write command to the peripheral component indicated by the transmission source information read by the transmission source information-reading unit, the memory write command being a command for writing information indicating that a failure has occurred in the I/O bridge device.

2. The I/O bridge device according to claim 1, further comprising:
    a failure-reporting unit configured to report to an outside that a failure has occurred in the I/O bridge device when a command abnormality-determining unit determines that there is an abnormality in the command packet.

3. The I/O bridge device according to claim 1, wherein, when the command signal received by the command receiver has error information indicating that the command signal has an error, the write command transmitter transmits a memory write command to the peripheral component that is the transmission source of the command signal, the write command signal being a command for writing information indicating that an error has occurred in the command signal before the command signal arrives at the I/O bridge device in a built-in memory of the peripheral component.

4. A response-reporting method for an I/O bridge device that transfers commands between a memory controller for performing processes to a main storage device and a peripheral component, the method comprising:
    receiving a command signal indicating a command to the memory controller from the peripheral component;
    converting the command signal into a command packet including the command indicated by the command signal and identification information for identifying the command signal;
    transmitting the command packet to the memory controller;
    receiving, from the memory controller, a response packet to the command packet, the response packet including the identification information included in the command packet;
    transmitting a write command signal to the peripheral component that is a transmission source of the command signal indicated by the identification information included in the response packet, the write command signal indicating a command for writing a content of the response packet to an internal memory of the peripheral component;
    storing, in a storage unit, the identification information for identifying the command signal, and transmission source information indicating the peripheral component that is the transmission source of the command signal, in association with each other;

reading the transmission source information associated with the identification information included in the response packet; and detecting an internal error in the I/O bridge device, wherein the write command signal is transmitted to the peripheral component indicated by the transmission source information, and when it is determined that there is an internal error in the I/O bridge device, the transmission source information stored in the storage unit is read, and a memory write command is transmitted to the peripheral component indicated by the transmission source information, the memory write command being a command for writing information indicating that a failure has occurred in the I/O bridge device.

5. A non-transitory recording medium storing a computer program for making an I/O bridge device, which transfers commands between a memory controller for performing processes to a main storage device and a peripheral component, function as:

a command receiver configured to receive a command signal indicating a command to the memory controller from the peripheral component;

a converter configured to convert the command signal received by the command receiver into a command packet including the command indicated by the command signal and identification information for identifying the command signal received by the command receiver;

a command transmitter configured to transmit the command packet converted by the converter to the memory controller;

a response receiver configured to receive, from the memory controller, a response packet to the command packet transmitted by the command transmitter, the response packet including the identification information included in the command packet transmitted by the command transmitter;

a write command transmitter configured to transmit a write command signal to the peripheral component that is a transmission source of the command signal indicated by the identification information included in the response packet received by the response receiver, the write command signal indicating a command for writing a content of the response packet received by the response receiver to an internal memory of the peripheral component;

a recorder configured to store, in a storage unit, the identification information for identifying the command signal received by the command receiver, and transmission source information indicating the peripheral component that is the transmission source of the command signal received by the command receiver, in association with each other;

a transmission source information-reading unit configured to read the transmission source information associated with the identification information included in the response packet received by the command receiver; and an internal error-detecting unit configured to detect an internal error in the I/O bridge device, wherein the write command transmitter transmits the write command signal to the peripheral component indicated by the transmission source information read by the transmission source information-reading unit, when the internal error-detecting unit determines that there is an internal error in the I/O bridge device, the transmission source information-reading unit reads the transmission source information stored in the storage unit, and the write command transmitter transmits a memory write command to the peripheral component indicated by the transmission source information read by the transmission source information-reading unit, the memory write command being a command for writing information indicating that a failure has occurred in the I/O bridge device.

\* \* \* \* \*